April 28, 1931.  F. W. ADAMS ET AL  1,802,327
WEIGHING DEVICE
Filed May 23, 1923

Floyd W. Adams
Charles E. Moulson, Inventors
By their Attorney, Chas. W. Mortimer Patented Apr. 28, 1931

1,802,327

UNITED STATES PATENT OFFICE

FLOYD W. ADAMS AND CHARLES E. MOULSON, OF PEORIA, ILLINOIS, ASSIGNORS TO THE BARRETT COMPANY, A CORPORATION OF NEW JERSEY

WEIGHING DEVICE

Application filed May 23, 1923. Serial No. 640,852.

This invention relates to a device for ascertaining readily the relative weights of articles. By this invention a system of beams is provided which may be successively balanced or placed in equilibrium with a plurality of loads or articles suspended therefrom or attached thereto. A slidable or adjustable weight or counterpoise is also associated with the system and adapted to be moved to and from the pivot point to facilitate bringing the parts to a balanced condition. A graduated scale is associated with the portion along which the weight slides and this scale may be so graduated that the relative weights of articles or the percentage weight of one article in comparison with that of another may be directly read from the scale without making calculations and without regard to the actual weights of the articles to be compared. Provision is also made by which the articles to be weighed or compared may be moved to different distances from the main fulcrum or pivot point of the system and, if desired, may be clamped or fixed temporarily in the adjusted positions.

The invention will be understood from the embodiment thereof illustrated in the accompanying drawings and described below.

Figure 1:
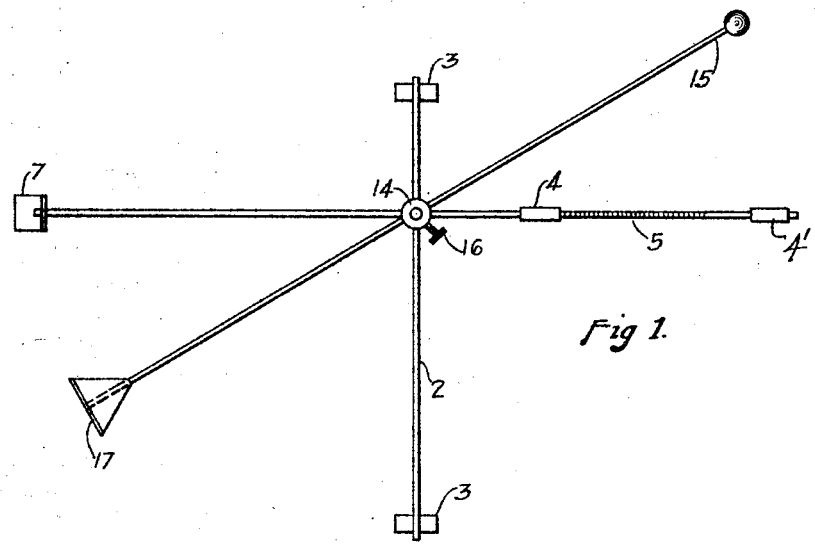
Fig. 1 is a plan view of the device.
Figure 2:
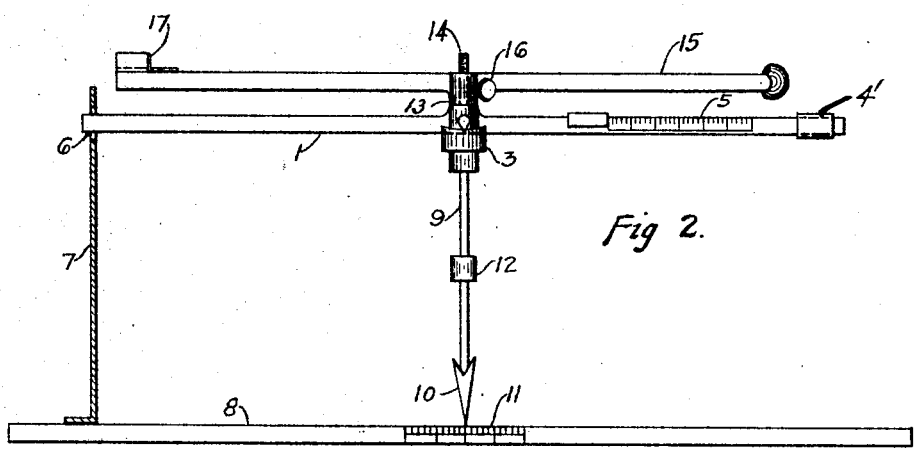
Fig. 2 is a side view of same.

In the drawings, reference character 1 refers to a beam or rod which is pivoted near its center by means of the cross pin or pivot 2 on the fulcrums or pivots 3. This beam 1 is provided with a slidable weight 4 which is adapted to slide along the graduated scale 5 on said beam 1 and the beam 1 may also be provided with or has associated therewith a fixed weight 4'. One end of the beam 1 projects into a slot 6 in the stop 7 which slot permits the end of the beam 1 to oscillate up and down through a short arc. The stop 7 is mounted upon a base 8 and a rod 9 depends from the lower side of the beam 1 in the plane of its pivot and carries a pointer 10 which passes over a scale 11 on the base 8. The rod 9 also carries a weight or counterpoise 12 of such size that the center of gravity of the beam 1, rod 9 and weight 12 will be below the pivot 2.

The upper side of the beam 1 is provided with a bearing surface 13 above its pivot 2 and the pin 14 projects upwardly from near the center of the bearing surface 13 of the beam 1. A beam 15 is pivoted on the pin 14 and rests upon the bearing 13 so as to turn in a horizontal plane and is provided with a set screw 16, the end of which can be brought into contact with the pin 14 to prevent the beam 15 from turning. Instead of the set screw 16, the upper end of the pin 14 may be threaded and a nut thereon may clamp the beam 15 on the beam 1. A scale pan or article holder 17 is attached to one end of the beam 15. The operation is as follows:

The beam 1 is placed with its pivot 2 on the fulcrums 3 so as to swing or oscillate in a vertical plane and should be so proportioned or adjusted that it will come to rest with one end approximately midway in the slot 6 with its pointer 10 at the zero point of the scale 11. The beam 15 carrying the scale pan 17 is then placed upon the pivot 14 and should be so constructed or adjusted that the beam 1 will not be disturbed in position regardless of any position to which the beam 15 may be turned. An article is then placed in the scale pan 17. The fixed weight 4' is placed in position, the weight 4 is placed at the first point of the scale 5 and the beam 15 is turned horizontally thereby moving the article or load in a curvilinear path and adjusting its distance from a vertical plane through the pivot 2 until it reaches such a position that the pointer 10 will come to the zero point of the scale 11 and the set screw 16 or a nut on pin 14 or other suitable securing means is tightened to prevent the beam 15 from being accidentally turned, thereby preventing relative movement between beams 15 and 1. The article is then removed and a different article is placed in the scale pan 17 and the weight 4 is then adjusted until equilibrium is again reached with the pointer 10 at the zero point of the scale 11. The respective readings on the scale 5 at the two times that the articles were placed in the scale pan 17 will show directly the relative weights of the two articles provided the scale 5 has been properly graduated for this purpose, so that it is not necessary to make any calculations to determine the relative weights of the articles. The direction in which the weight 4 is moved on the scale 5 will of course determine whether the second article has a greater or less relative weight than the article first balanced.

The device has been found to be especially applicable, for example, in showing the percentage of saturation of samples of felt. In determining percent saturation of samples of felt, the unsaturated sample is first placed in the scale pan 17 with the weight 4 at the first point of the scale 5 and the beam 15 is turned until equilibrium is established. The beam 15 is then clamped in position, the sample removed and immersed in a bath of saturating or waterproofing material and kept there for the desired length of time, after which it is removed from the saturating bath and replaced in the scale pan 17 and the weight 4 adjusted until equilibrium is again established. The scale 5 having been properly graduated, the percentage saturation can be read from this scale regardless of the size of the particular sample of felt that was being tested.

We claim:

1. In a device of the character described, a beam pivoted to swing in a vertical plane, a second beam pivoted to said first named beam above its center of gravity, a weight adjustable on said first beam, and a load holder carried by said second beam.

2. In a device of the character described, a beam pivoted to swing in a vertical plane, a second beam carrying a load holder, said second beam being pivoted to said first named beam in the vertical plane in which said first named beam swings and above its center of gravity.

3. In a device of the character described, a balance beam, a second beam pivoted thereto in the plane in which the first named beam swings and carrying a scale pan, and a slidable weight for balancing said beams with the scale pan either empty or loaded.

4. In a device of the character described, a balance beam, a second beam pivoted thereto in a plane through the pivot of said balance beam and carrying a scale pan, a weight adjustable along said balance beam and a scale on said balance beam graduated to indicate relative weights of articles successively placed upon said scale pan.

5. In a device of the character described, a beam pivoted to swing in a vertical plane, a second beam pivoted to said first named beam in a plane through the pivot thereof, a load holder carried by said second beam, a fixed weight on said first beam and an adjustable weight on said first beam for determining the relative weights of articles placed upon the load holder.

6. In a device of the character described, a beam pivoted to swing in a vertical plane, a second beam pivoted to said first named beam in the plane of its pivot and adopted to swing in a horizontal plane, a fixed weight and an adjustable weight on said first beam, and a load holder carried by said second beam, said first beam being graduated whereby the positions of said adjustable weight will indicate relative weights of loads carried by said load holder.

7. A device for determining relative weights of articles which comprises a pivotally supported beam adapted to swing in a vertical plane, another beam pivotally supported on said first mentioned beam and provided with a load carrier, said second mentioned beam being pivotally mounted on said first mentioned beam so as to be swingable horizontally when said first mentioned beam is horizontally disposed, and being adapted to swing in one plane only with respect to any given position of said first mentioned beam, a counterpoise associated with said first mentioned beam for indicating relative weights of articles positioned on the load carrier, and means for securing said beams when in adjusted position, thereby preventing relative movement thereof.

In testimony whereof we affix our signatures.

FLOYD W. ADAMS.
CHARLES E. MOULSON.